(12) United States Patent
Son

(10) Patent No.: US 10,897,857 B2
(45) Date of Patent: Jan. 26, 2021

(54) GRASS PROTECTION MAT WITH BOTTOM SUPPORTING MAT AND METHOD OF CONSTRUCTING THE SAME

(71) Applicants: Seo-Young Park, Seongnam-si (KR); Gyeul Son, Jocheon-eup (KR)

(72) Inventor: Chang-Sub Son, Gyeonggi-do (KR)

(73) Assignee: Seo-Young Park, Seoognam-si (KR)

( * ) Notice: Subject to any disclaimer, the term of this patent is extended or adjusted under 35 U.S.C. 154(b) by 391 days.

(21) Appl. No.: 15/921,865

(22) Filed: Mar. 15, 2018

(65) Prior Publication Data

US 2018/0332780 A1    Nov. 22, 2018

(30) Foreign Application Priority Data

Mar. 17, 2017    (KR) .................. 10-2017-0033847

(51) Int. Cl.
*A01G 13/02*    (2006.01)
*A01G 20/00*    (2018.01)

(52) U.S. Cl.
CPC ..... *A01G 13/0268* (2013.01); *A01G 13/0293* (2013.01); *A01G 20/00* (2018.02)

(58) Field of Classification Search
CPC ............. A01G 13/0268; A01G 20/00; A01G 13/0293; A01G 13/0256; A01G 9/033; E01C 9/004; E01C 5/005; E01C 2201/14; E01C 2201/12; E01C 2201/16; E01C 5/00
USPC .............................................. 404/35, 41, 36
See application file for complete search history.

(56) References Cited

U.S. PATENT DOCUMENTS

| 4,596,731 | A  | * | 6/1986  | Cudmore   | A63C 19/04 404/36 |
| 8,128,311 | B2 | * | 3/2012  | Son       | E01C 5/005 404/36 |
| 8,403,592 | B2 | * | 3/2013  | Son       | A01G 20/00 404/35 |
| 10,352,002 | B2 | * | 7/2019 | Son       | E01C 5/005 |
| 10,358,775 | B2 | * | 7/2019 | Son       | A01G 13/0268 |
| 2004/0025423 | A1 | * | 2/2004 | Hinsperger | A01G 13/0268 47/9 |
| 2010/0024293 | A1 | * | 2/2010 | Son       | E01C 9/004 47/20.1 |
| 2010/0293848 | A1 | * | 11/2010 | Son      | A01G 20/00 47/31.1 |
| 2014/0173978 | A1 | * | 6/2014 | Kim       | A01G 13/0268 47/20.1 |

(Continued)

FOREIGN PATENT DOCUMENTS

| KR | 20-0416783    | 5/2006 |
| KR | 10-2008-0018787 | 2/2008 |
| KR | 10-2010-0012549 | 2/2010 |

*Primary Examiner* — Trinh T Nguyen

(57) ABSTRACT

Disclosed is a grass protection mat for soft ground, comprising: an upper mat comprising a first body in which first grass passing spaces are continuously arranged and a first outer frame formed to finish an outer edge of the first body; and a bottom supporting mat which is arranged under the upper mat, wherein the bottom supporting mat comprises a second body in which second grass passing spaces are continuously arranged, and one or more hook fasteners which protrudes from the second body at a predetermined position corresponding to the first outer frame of the upper mat so that it is hooked to and coupled with a portion of the first outer frame.

9 Claims, 10 Drawing Sheets

(56) References Cited

U.S. PATENT DOCUMENTS

2014/0352208 A1* 12/2014 Makropoulos ..... A01G 13/0206
 47/31.1
2018/0305872 A1* 10/2018 Son ........................ E01C 19/52

* cited by examiner

GRASS PROTECTION MAT WITH BOTTOM SUPPORTING MAT AND METHOD OF CONSTRUCTING THE SAME

RELATED APPLICATIONS

This application claims the benefit of priority of Korean Patent Application No. 10-2017-0033847, filed on Mar. 17, 2017, the contents of which are incorporated herein by reference in their entirety.

FIELD OF THE INVENTION

The present disclosure relates to a grass protection mat for soft ground and a method of constructing the same, and more particularly to a grass protection mat for soft ground and a method of constructing the same, in which load is spread to prevent grass from damage and compatibility and convenience in replacement and construction are promoted.

BACKGROUND OF THE INVENTION

In a growth area for grass, such as a golf course, a lawn, grassplot in a park and the like, the grass is continuously trampled down and damaged by people, vehicles and the like, and therefore renovation of grass is a considerable expense.

Accordingly, a grass protection mat has been constructed in the growth area for grass to prevent a growing point of grass from being damaged and buffer a load even though it is repeatedly trampled down by people, vehicles and the like.

As above, a conventional grass protection mat has been published in Korean Patent No. 10-0898546.

Korean Patent No. 10-0898546 discloses the grass protection mat which is easy to connect neighboring mats and is prevented from subsidence due to a load. This grass protection mat basically includes a body, rugs, projection pillars, buffering wings, and an outer frame.

However, the conventional grass protection mat is manufactured to have a certain shape with subsidence preventing means arranged at fixed intervals, and therefore cannot be adaptively adjusted according to the states of soil in which the grass protection mat will be installed.

Further, when the grass protection mat is partially recessed and a grass runner circumferentially propagates through an upper space of the body, the grass runner may be repeatedly trampled down by people, vehicles and the like, which limits to the propagation of the grass.

In terms of constructing such a conventional grass protection mat on the ground, a mat coupling tool (for example, a fastening peg member such as an iron pin or the like) is generally provided to couple and fasten the grass protection mats to the ground. The mat coupling tool has a fastening pin structure to be fastened to the ground, and a pillar structure to be stuck in the ground by driving each fastening pin from an upper side of the mat downward.

However, such a fastening pin structure not only needs excessive force for every coupling tool since the coupling tool has to be pressed against or driven into the ground from above, but also has difficulty in construction since it takes long time to be constructed.

Further, when it is desired to replace the mat with another mat or move the mat due to a change of season or ground, the constructed mat coupling tool has to be first pulled out and removed. Therefore, it is not easy to remove the mat.

Besides, when external force caused by people's feet or the like is repetitively applied to the mat coupling tool, it may be shaken and gradually pulled out. Therefore, there is a problem that people may fall over a partially protruding coupling tool.

SUMMARY OF THE INVENTION

Accordingly, the present disclosure is conceived to solve the foregoing problems, and an aspect of the present disclosure is to provide a grass protection mat for soft ground and a method of constructing the same, in which a hook fastener provided in the bottom supporting mat of the grass protection mat is used to facilitate attachment/detachment between the bottom supporting mat previously fastened to the ground and the upper mat arranged thereon, so that the mats can be coupled and separated without any additional fastening tool, thereby promoting convenience in the construction.

Further, another aspect of the present disclosure is to provide a grass protection mat for soft ground and a method of constructing the same, in which the bottom supporting mat and the upper mat are more easily attached and detached, and thereby the mats having various shapes are selectively replaced or applied depending to characteristics of soil.

Further, still another aspect of the present disclosure is to provide a grass protection mat for soft ground and a method of constructing the same, in which a ground peg protruding downward to more firmly support the bottom supporting mat is used to easily connect and fasten the grass protection mat without sliding on the ground.

In accordance with an embodiment of the present disclosure to accomplish the above purpose, a grass protection mat for soft ground comprises:

an upper mat comprising a first body in which first grass passing spaces are continuously arranged and a first outer frame formed to finish an outer edge of the first body; and a bottom supporting mat a bottom supporting mat which is arranged under the upper mat, wherein the bottom supporting mat comprises a second body in which second grass passing spaces are continuously arranged, and one or more hook fasteners which protrudes from the second body at a predetermined position corresponding to the first outer frame of the upper mat so that it is hooked to and coupled with a portion of the first outer frame.

The hook fastener may protrude vertically upward from the second body of the bottom supporting mat.

The hook fastener may have a predetermined height to be coupled with the first outer frame.

The bottom supporting mat may further comprise a ground peg protruding from the bottom thereof to fasten the bottom supporting mat to ground.

The ground peg may have a pillar or sharp shape to be smoothly driven into ground.

The ground peg may protrude toward ground from a position corresponding to an edge of the first outer frame.

The ground peg may be formed to be longer than rugs protruding toward ground from the bottom of the second body.

The first body of the upper mat and the second body of the bottom supporting mat may be different in shape in accordance with kinds of soil where grass grows.

The first body of the upper mat and the second body of the bottom supporting mat may have the same size or shape.

The upper mat and the bottom supporting mat may be different in unit area.

The bottom supporting mat may further comprise a second outer frame having a quadrangular shape for finishing the outer edge of the second body to maintain an overall mat shape, and the second outer frame is formed with a groove recessed on a bottom thereof along a lengthwise direction.

The second body may be formed with a groove recessed on a bottom thereof along a lengthwise direction.

In accordance with an embodiment of the present disclosure, a method of constructing a grass protection mat comprises:

fastening one or more bottom supporting mat(s) to ground, which comprises a plurality of second bodies provided with continuously arranged second grass passing spaces, and one or more hook fasteners each of which is supported on and hooked to a respective second body at a predetermined position; and attaching one or more upper mat(s) to the bottom supporting mats by the hook fasteners, wherein each of the upper mats comprises a plurality of first bodies provided with continuously arranged first grass passing spaces, and a first outer frame formed to finish an outer edge of the first body.

The hook fastener may protrude vertically upward from the second body of the bottom supporting mat.

The hook fastener may have a predetermined height to be fastened to the first outer frame.

The fastening of the bottom supporting mat to ground may be performed by a ground peg protruding downward from a bottom of the bottom supporting mat.

The ground peg may have a pillar or sharp shape to be smoothly driven into ground.

The ground peg may protrude downward to ground from a position corresponding to an edge of the first outer frame.

The ground peg may be formed to be longer than a rug protruding toward ground from the bottom of the second body.

The first body of the upper mat and the second body of the bottom supporting mat may be different in shape in accordance with kinds of soil where grass grows.

The first body of the upper mat and the second body of the bottom supporting mat may have the same size or shape.

The upper mat and the bottom supporting mat may be different in unit area.

BRIEF DESCRIPTION OF THE SEVERAL VIEWS OF THE DRAWING(S)

The above and/or other aspects of the present disclosure will become apparent and more readily appreciated from the following description of the exemplary embodiments, taken in conjunction with the accompanying drawings, in which.

Figure 1:
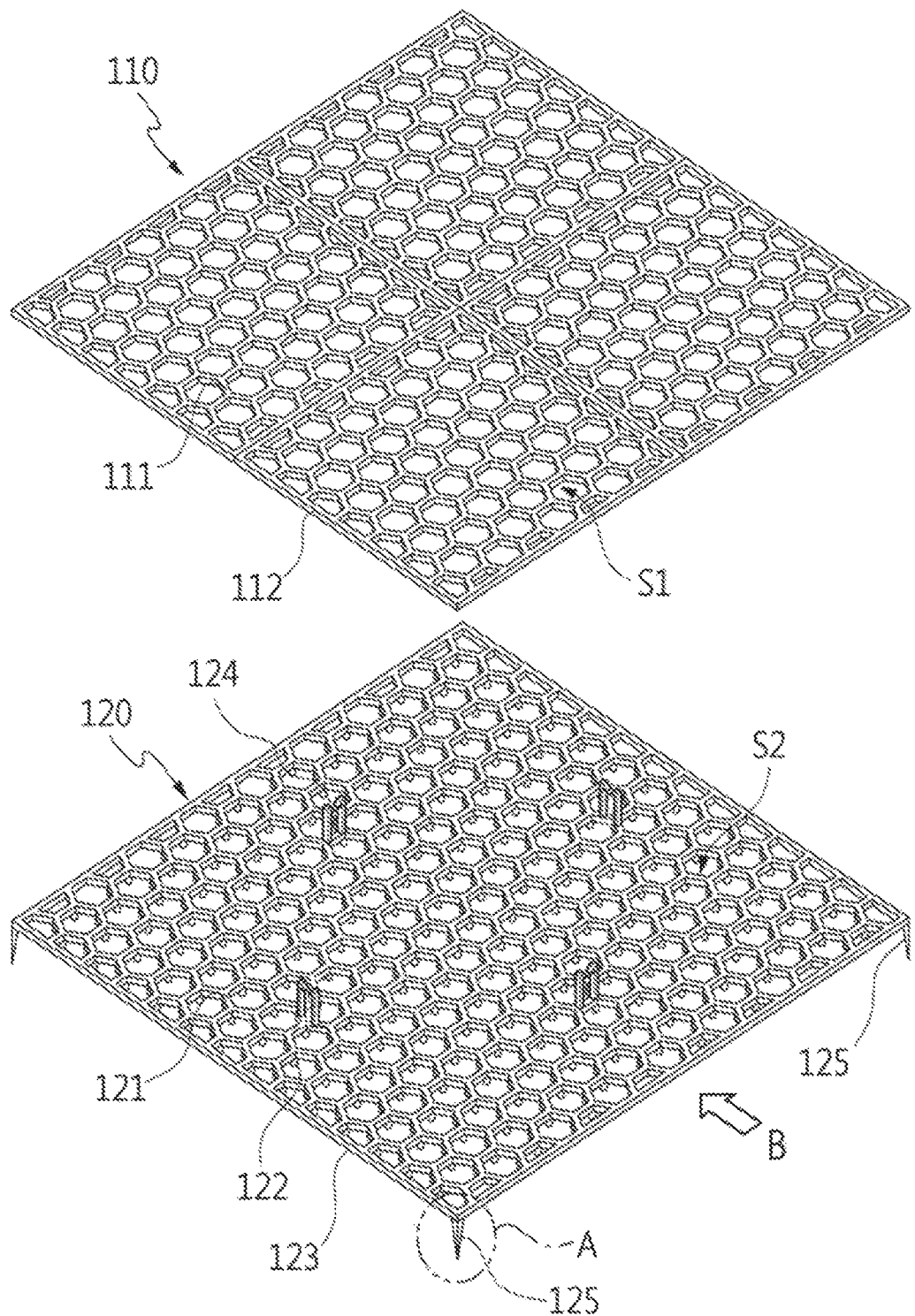
FIG. 1 is an exploded perspective view of a bottom supporting mat and a upper mat arranged thereon according to a first embodiment of the present disclosure.
Figure 4A:
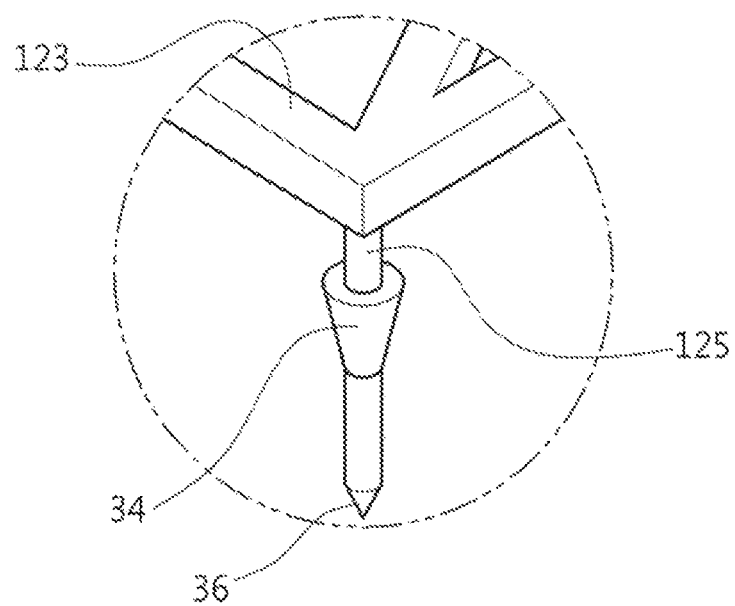
Figure 4B:
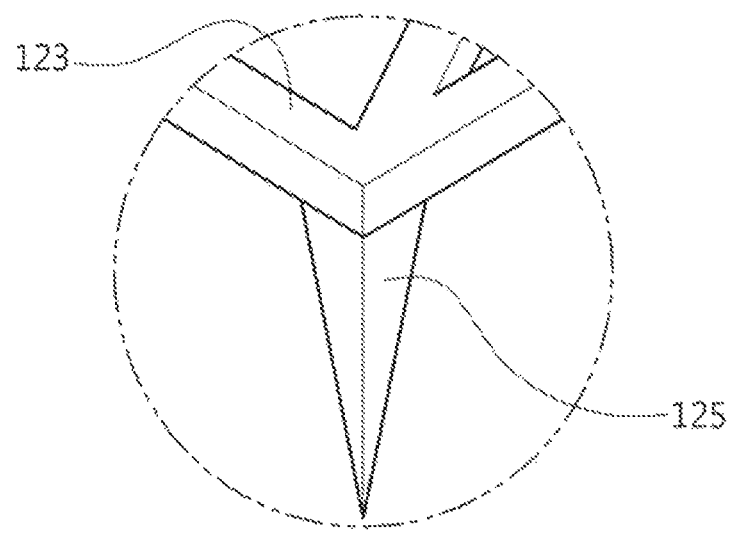
Figure 5:
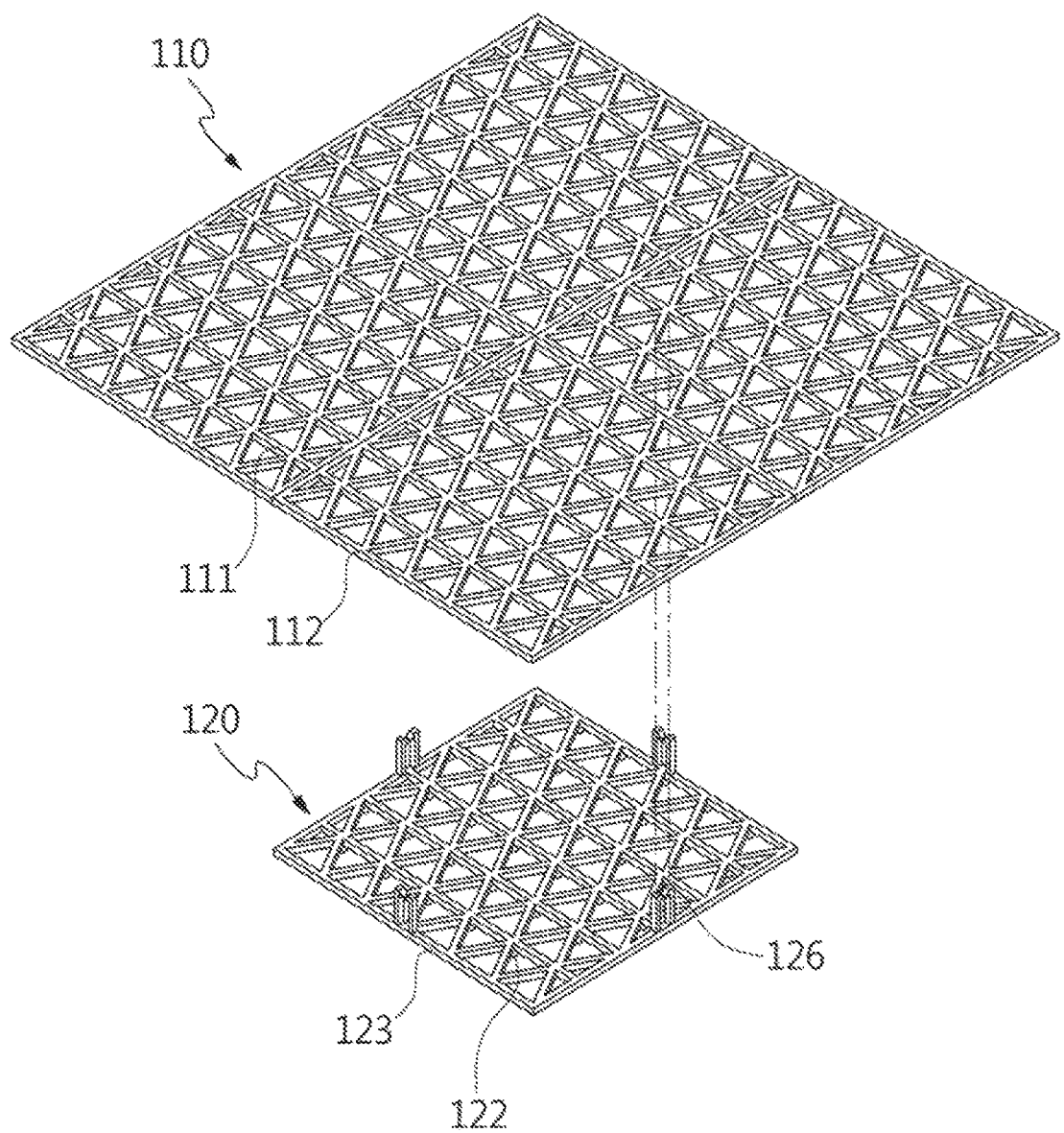
Figure 6:
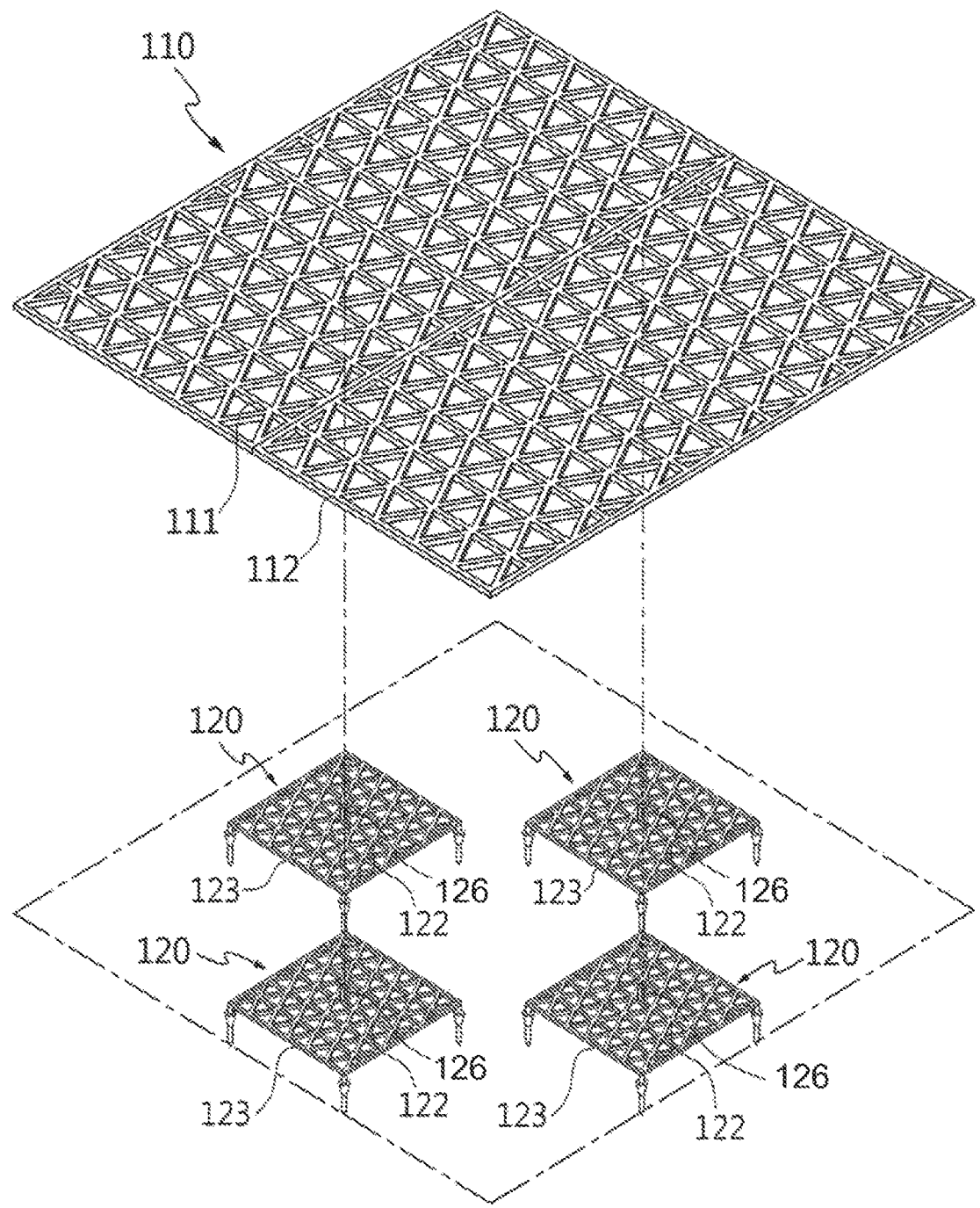
Figure 7:
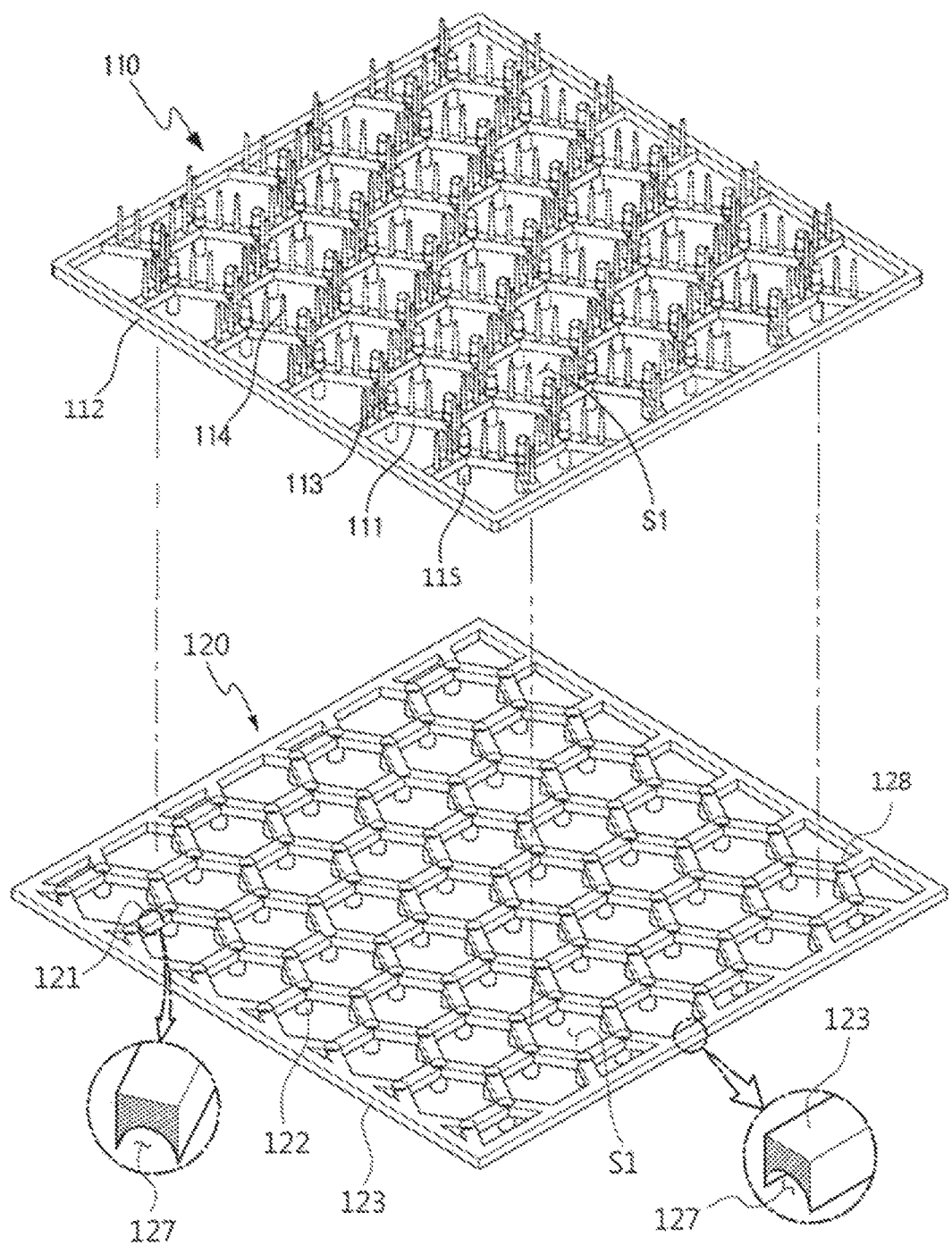
Figure 8A:
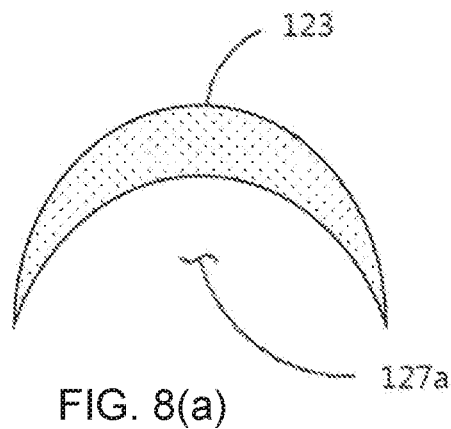
Figure 8B:
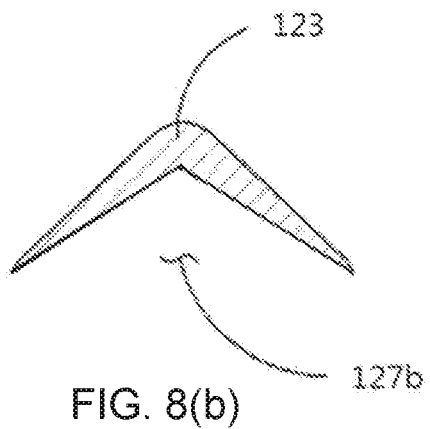
Figure 8C:
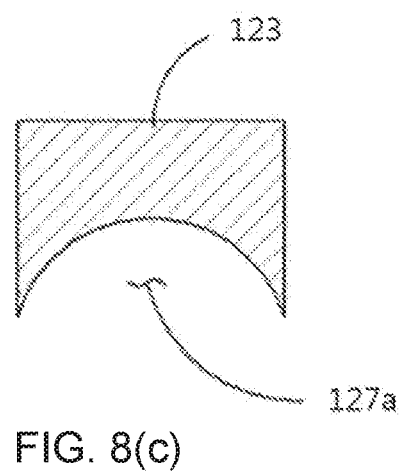
Figure 8D:
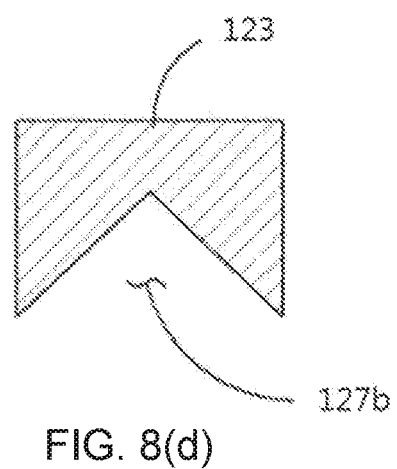
Figure 9:
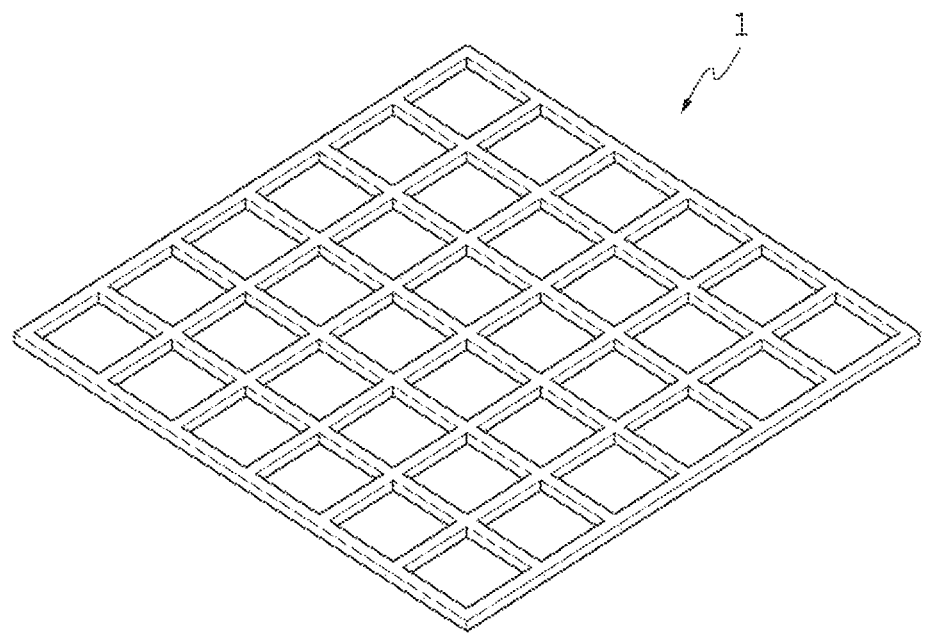
Figure 10:
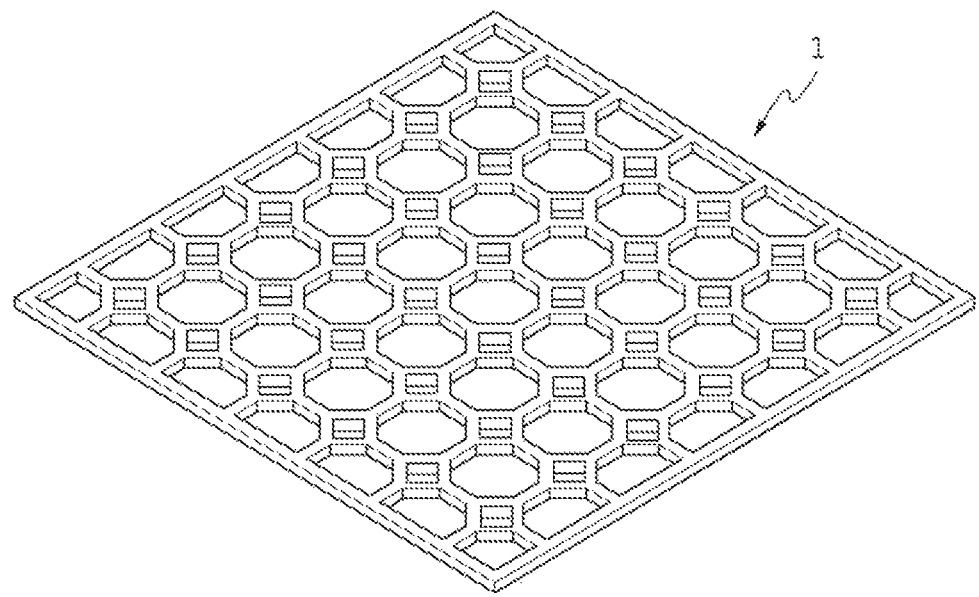
Figure 11:
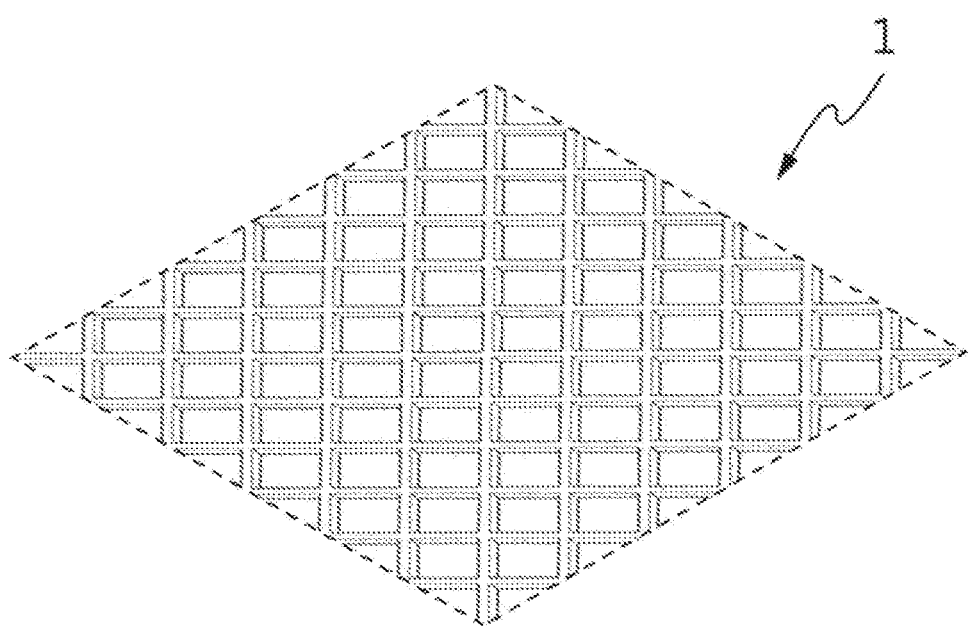

FIG. 4 (*a*) and FIG. 4 (*b*) are enlarged views of a ground peg provided beneath the bottom supporting mat shown in 'A' of FIG. 1;

FIG. 5 and FIG. 6 are exploded perspective views of a bottom supporting mat and an upper mat arranged thereon according to a second embodiment of the present disclosure;

FIG. 7 is an exploded perspective view of the upper mat with a subsidence preventing groove according to the present disclosure;

FIGS. 8(*a*), 8(*b*), 8(*c*) and 8(*d*) are views of showing various shapes of the groove formed in the upper mat according to the present disclosure; and FIGS. 9, 10 and 11 are views showing various shapes of the upper mats according to the present disclosure.

DESCRIPTION OF SPECIFIC EMBODIMENTS OF THE INVENTION

Hereinafter, embodiments of the present disclosure will be described in detail with reference to the accompanying drawings to be easily realized by a person having an ordinary skill in the art to which the present disclosure pertains. However, the present disclosure may be variously implemented and not limited to the embodiments set forth herein. Further, unrelated parts are omitted in the drawings for clear description, and like elements refer to like numerals throughout the specification.

Prior to description, the same elements given with same numerals will be representatively described in the first embodiment, and different elements from those of the first embodiment will be described in other embodiments.

Below, a bottom supporting mat, from which an upper mat is detachable, according to the first embodiment will be described in detail with reference to the accompanying drawings.

According to the present disclosure, each of a bottom supporting mat 120 and a upper mat 110 respectively includes bodies in which the grass passing spaces basically having a shape selected among polygonal (e.g. a hexagonal shape) or circular shapes for improving growth or rootage of grass are continuously connected to have a predetermined pattern.

The grass passing spaces may have various shapes of a quadrangular (diamond), triangular, hexagonal, octagonal, circular or the like. In accordance with ground characteristics, seasons, environments, etc. the bodies of the bottom supporting mat 120 and the upper mat 110 may have the same shape or different shapes. In this exemplary embodiment, the upper mat 110 is manufactured to have a hexagonal body, and the bottom supporting mat 120 is manufactured to have a hexagonal body, thereby forming the first grass passing spaces S1. However, there are no limits to the shape of the body.

Among structures for continuously connecting the first grass passing spaces S1 by the upper mats with one another, such a hexagonal shape is advantageous to maximize the area of the first grass passing space S1. In case of the hexagonal body, the area of the first grass passing space S1 is greater than that of other polygonal or circular body, thereby making active photosynthesis in grass.

In other words, the first body may be manufactured to include the first grass passing space S1 having not only the hexagonal shape but also various shapes as long as it is taken into account that a growth space for grass is expanded, the photosynthesis of the grass goes actively through the expanded growth space, and the body has no wasteful spaces.

FIG. 1 is an exploded perspective view of a bottom supporting mat and an upper mat arranged thereon according to the first embodiment of the present disclosure. FIG. 1 shows that the bottom supporting mat and the upper mat have the same unit area, but may be different in unit area from each other. For example, the unit area of the bottom supporting mat may be smaller than that of the upper mat.

Figure 2:
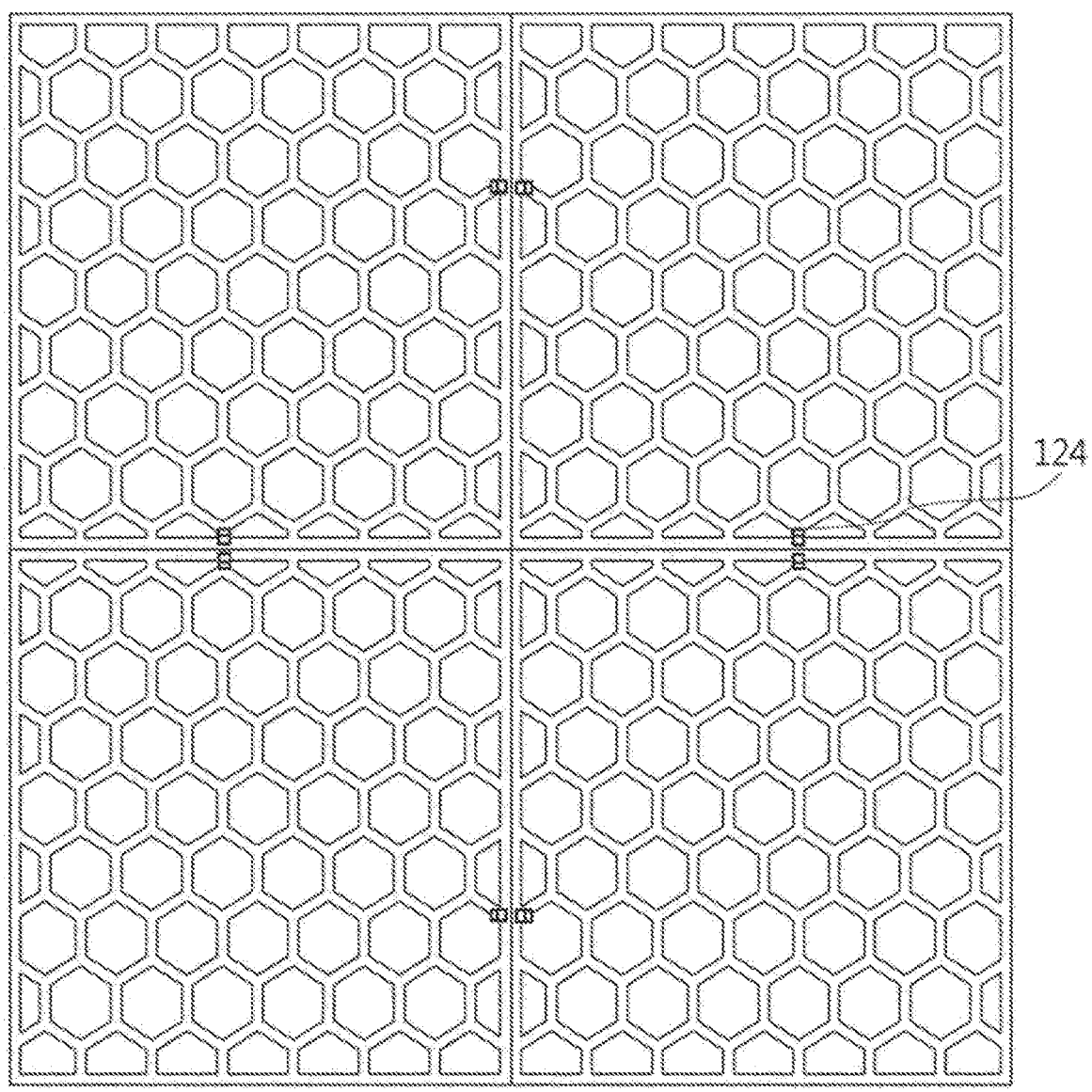
FIG. 2 is a plan view of the bottom supporting mat and the upper mat according to the first embodiment of the present disclosure.
Figure 3:
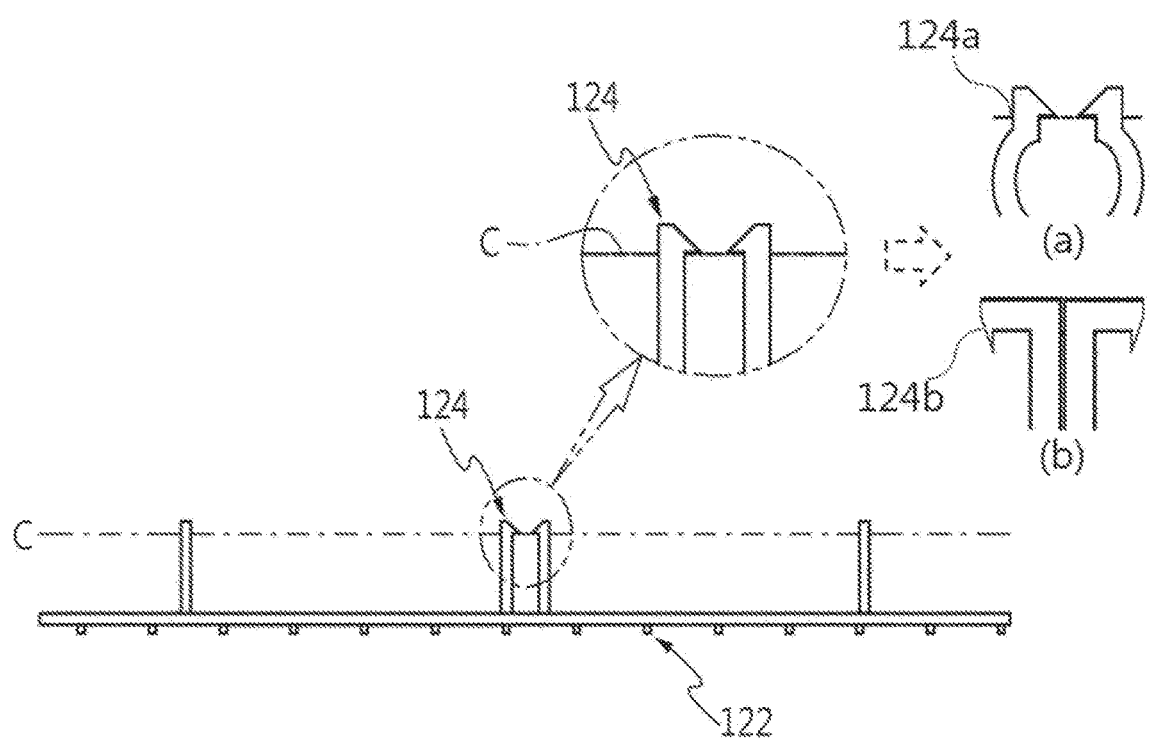
FIG. 3 is a lateral cross-section view of the bottom supporting mat and the upper mat, viewed in a direction of 'B' according to the first embodiment of the present disclosure.

FIG. 2 is a plan view of the bottom supporting mat and the upper mat according to the first embodiment of the present disclosure, and FIG. 3 is a lateral cross-section view of the bottom supporting mat and the upper mat, viewed in a direction of 'B' according to the first embodiment of the present disclosure;

The embodiment shown in FIG. 1 includes the upper mat 110, and the bottom supporting mat 120 overlapping-arranged under the grass protection mat 110.

Referring to FIG. 1, four unit mats are assembled into one upper mat 110. Each unit mat of the upper mat 110 includes a first body 111, and a first outer frame 112.

The first body 111 is provided on the ground where grass grows, and forms the first grass passing space S1 through which the grass can photosynthesize and grow. The first bodies 111 are continuously arranged and integrally connected to thereby constitute an overall frame of the upper mat 110.

The first body 111 may have a triangular, octagonal, quadrangular (diamond) or the like polygonal or circular shape. According to this exemplary embodiment, the hexagonal shape will be described by way of example among the structures for continuously connecting the first grass passing spaces S1.

The first outer frame 112 refers to a member positioned at an outer or inner side of each unit mat among quadrangular members of finishing the outer edges of four unit mats that constitute the upper mat 110. That is, as shown in FIG. 1 and FIG. 2, the first outer frame 112 may include a straight member positioned at a quadrisection line or an outer quadrangular frame on a plane.

Further, a separate fastening means may be added to connect neighboring upper mats 110, at a specific position on an outermost portion of the upper mat 110 on the first outer frames 112.

The bottom supporting mat 120 is arranged under the grass protection mat 110, and may include a second body 121, a rug 122, a second outer frame 123, a hook fastener 124 and a ground peg 125.

The second body 121 is provided on the ground where grass grows, and forms the second grass passing space S2 through which the grass can photosynthesize and grow. The second bodies 121 are continuously arranged and integrally connected to thereby constitute an overall frame of the bottom supporting mat 120.

The second grass passing space S2 of the second body 121 and the first grass passing space S1 of the first body 111 may have the same size or same shape to secure a grass growth space, facilitate the photosynthesis, and allow the mats to be easily detached and attached.

Alternatively, the second body 121 and the first body 111 may be different in size or shape from each other as necessary.

The second body 121 may have a hexagonal, octagonal, quadrangular (diamond) or the like polygonal or circular shape. According to this exemplary embodiment, the second body 121 having the hexagonal shape to overlap with the first body 111 at edges will be described by way of example among structures for continuously connecting the second grass passing spaces S2.

The rug 122 is provided beneath and supports the second body 121. The rug 122 is in contact with the ground and supports the second body 121 to be spaced apart at a predetermined distance from the ground. According to one embodiment of the present disclosure, the rug 122 protrudes toward the ground from each edge of the second body 121 having the hexagonal shape, but is not limited thereto.

The second outer frame 123 refers to a member having a quadrangular shape and finishing the outer edges of the second body 121. The second outer frame 123 may further include separate fastening means (not shown) to maintain an overall shape of the bottom supporting mat 120 and connect with other neighboring bottom supporting mat 120.

The hook fastener 124 may protrude from the second body 121 of the bottom supporting mat 120 at a predetermined position. For example, the hook fastener 124 is formed to vertically protrude upward from the second body 121 of the bottom supporting mat 120. The hook fastener 124 may be formed to be hooked to the first outer frame 112 of the upper mat 110 when the upper mat 110 is put on the bottom supporting mat 120 and then pressed toward the ground.

Further, referring to FIGS. 1 to 3, two hook fasteners 124 may form a pair to connect the first outer frames 112 of two unit mats, and total four pairs of hook fasteners 124 are provided per the upper mat 110. However, there are no limits to the number of hook fasteners.

For example, as shown in FIGS. 1 to 3, two pairs of hook fasteners 124 may be provided at symmetrical up and down positions with respect to a line of horizontally bisecting the bottom supporting mat 120 in a plane view. Likewise, two pairs of hook fasteners 124 may be provided at symmetrical right and left positions with respect to a line of vertically bisecting the bottom supporting mat 120. That is, the positions of the hook fasteners 124 on the horizontal bisecting line or the vertical bisecting line on the plane of the bottom supporting mat 120 may correspond to predetermined positions on the first outer frame 112 of the upper mat 110.

For example, as shown in FIG. 2, the hook fasteners 124 on the line of vertically bisecting the bottom supporting mat 120 are provided to face with each other at a pair of bodies adjacent to the line, and supported on and hooked to the bodies. Further, the hook fasteners 124 on the line of horizontally bisecting the bottom supporting mat 120 are provided at a pair of bodies closest to the line, and supported on and hooked to the bodies. There are no limits to such positions of the hook fasteners 124. Alternatively, the hook fasteners may be provided at other positions when easy attachment/detachment of the mats is taken into account.

The ground peg 125 is provided under the second outer frame 123 of the bottom supporting mat 120, and fastens the second outer frame 123 to the ground. The ground pegs 125 are provided at predetermined positions under the second outer frame 123, for example, at four positions corresponding to vertices of the overall quadrangular shape of the second outer frame 123 of the mat from a view of a plane of the mat. However, there are no limits to the positions of the ground pegs.

FIG. 4 (*a*) and FIG. 4 (*b*) are enlarged views of a ground peg provided beneath the bottom supporting mat shown in 'A' of FIG. 1;

FIG. 4 (*a*) illustrates that the ground peg 125 has a pillar member shaped like a rod. As shown in FIG. 4 (*a*), the pillar member may be integrally formed with a sharp cone 36 to be smoothly driven into the ground. Further, the pillar member may be integrally formed with at least one separation preventing projection 34 to prevent the pillar member from being backwardly pulled out after being driven into the ground.

Further, as shown in FIG. 4 (b), the ground peg 125 may have a sharp member which is formed as a plate to be in contact with the ground and has a sharp shape for making the plate be driven and fastened into the ground without sliding. The ground peg 125 is a member whose one end is sharp.

Like this, the ground peg 125 is configured to vertically protrude downward from the bottom of the second outer frame 123 and be easily driven and fixed into the ground.

The ground peg 125 has a predetermined depth, and this depth has to be deeper than the depth of the rug 122 vertically protruding downward from the bottom of the second body 121. This makes the ground peg 125 be more strongly driven and fixed into the ground than the rug 122, so that the mat can be more strongly supported on and fixed into the ground.

The ground peg 125 may be coupled with the second outer frame 123 by a predetermined adhesive means, or the ground peg 125 may be provided detachably from the second outer frame 123.

Next, a fastening process for the hook fastener according to the first embodiment of the present disclosure will be described with reference to FIG. 3.

When the upper mat 110 is put on the bottom supporting mat 120, the hook fastener 124 supported on and coupled to the second body 121 of the bottom supporting mat 120 is fastened to the first outer frame 112 of the upper mat 110.

In this case, the hook fastener 124 having a structure of vertically protruding upward may include an upper side to be hooked to the first outer frame 112 as described above with reference to FIG. 3. In FIG. 3, the alternated long and short dash line C shows that the hook fastener 124 is in contact with the top surface of the first outer frame 112 of the upper mat 110 when an upper hook of the hook fastener 124 is hooked to the first outer frame 112.

Alternatively, the hook fastener 124 may have other shapes by taking it into account that fastening force gets weaker as hooking is repetitively performed. For example, FIG. 3 (a) shows that hook fasteners 124a are curved to have an arc shape while facing with each other, and FIG. 3 (b) shows that upper hooks of hook fasteners 124b are arranged back to back to form a hook. The hook fasteners 124a and 124b shown in FIGS. 3 (a) and 3 (b) have fastening force stronger than that of the hook fastener 124. However, there are no limits to the shapes of the hook fastener 124.

Further, as shown in FIG. 2, the position at which the hook fastener 124 is hooked to the first outer frame 112 may correspond to the position at which the hook fastener 124 is coupled to and supported on the second body 121 from a view of a plane of the mat. In other words, from the view of the plane of the mat, the positions at which the hook fastener 124 and the first outer frame 112 are fastened may substantially overlap with the positions of the hook fasteners 124.

Like this, as the hook fastener 124 supported on and coupled to the second body 121 of the bottom supporting mat 120 is hooked to the first outer frame 112 of the upper mat 110, it is very easy to assemble and disassemble a vertically double structure of the upper mat and the bottom supporting mat.

Further, the hook fastener 124 has to have a suitable height to connect and hold the mats when the upper mat is put on the bottom supporting mat. That is, the height of the hook fastener 124 has to be set so that the hook fastener 124 can be hooked to the first outer frame 112 of the upper mat. In other words, the hook fastener 124 has to have a predetermined height so that the connection between the upper mat and the bottom supporting mat can be prevented from being loosened or being impossible when the hook fastener 124 is hooked to the first outer frame 112 of the upper mat. This is to more stably put and hold the upper mat 110 on the bottom supporting mat 120 of the vertically double structure by the hook fastener 124.

Further, the hook fastener 124 may be manufactured to form a single body with the second body 121, or be coupled with the second body 121 of the bottom supporting mat 120 by any coupling means, or be detachably provided in the second body 121.

The position, shape and number of hook fasteners 124 are not limited to those shown in the drawings. Alternatively, the position, shape and number of hook fasteners 124 may be varied to maximize coupling effects.

From now, operations of the detachable bottom supporting mat of the grass protection mat according to the present invention will be described.

First, the bottom supporting mat 120 is installed in an area where grass grows, the second body 121 of the bottom supporting mat 120 is arranged to be in close contact with the ground, and the rug 122 vertically protruding downward from the bottom of the second body 121 is driven into and fastened to the ground, thereby restricting movement of the bottom supporting mat 120. In particular, the ground peg 125 vertically protruding downward from the bottom of the second outer frame 123 is driven and fastened into the ground, thereby effectively preventing the bottom supporting mat 120 from freely moving on the ground.

Since the grass protection mat 110 is detachably provided, it is easy to construct the grass protection mat by replacing the upper mat 110 in accordance with the kinds or states of soil.

According to this exemplary embodiment, when the first body 111 and the second body 121 are provided to have the hexagonal shape, and each edge of the second body 121 is configured to be aligned with each edge of the first body 111, the bottom supporting mat 120 directly supported on the ground can be further prevented from subsidence even when soil is relatively soft and moist.

On the other hand, when soil is relatively hard, the space between the second bodies 121 can be expanded to secure the maximum grass passing space S1 while preventing the mat from subsidence.

FIG. 5 and FIG. 6 are exploded perspective views of a bottom supporting mat and an upper mat arranged thereon according to the second embodiment of the present disclosure.

Below, the second embodiment of the present disclosure will be described with reference to FIGS. 5 and 6.

FIG. 5 and FIG. 6 show that the upper mat 110 and the bottom supporting mat 120 are different in unit area from each other. In the second exemplary embodiment, main elements of the grass protection mat 110 and the bottom supporting mat 120 are the same as those described in the first exemplary embodiment, and thus repetitive descriptions will be omitted.

As shown in FIG. 5, a hook fastener 126 may be formed to protrude from a predetermined position on the second outer frame 123 of the bottom supporting mat 120. For example, the hook fastener 126 is formed to vertically protrude upward from the second outer frame 123 of the bottom supporting mat 120. The hook fastener 126 may be hooked and fastened to the first outer frame 112 of the upper mat 110 by putting and pressing the upper mat 110 on the bottom supporting mat 120.

That is, when the upper mat 110 is put on the bottom supporting mat 120, the hook fastener 126 supported on and coupled to the second outer frame 123 of the bottom supporting mat 120 is hooked to the first outer frame 112 of the upper mat 110.

In this case, the position at which the hook fastener 126 is hooked to the first outer frame 112 corresponds to the position at which the hook fastener 126 supported and coupled to the second outer frame 123 is provided from a view of the plane of the mat. That is, from the view of the plane of the mat, the positions where the hook fastener 126 and the first outer frame 112 are fastened may substantially overlap with the position of the hook fastener 126.

Like this, as the hook fastener 126 supported on and coupled to the second outer frame 123 of the bottom supporting mat 120 is hooked to the first outer frame 112 of the upper mat 110, it is possible to construct connection between the upper mat and the bottom supporting mat which are different in unit area.

According to the second exemplary embodiment, the hook fastener 126 is supported on and coupled to a predetermined position on the second outer frame 123 of the bottom supporting mat 120, but there are no limits to the position where the hook fastener 126 is arranged in the bottom supporting mat 120.

Therefore, the bottom supporting mat 120 may be implemented and arranged as shown in FIG. 6. Referring to FIG. 6, a hook fastener 126 may be formed to protrude from a predetermined position on the second outer frame 123 of the bottom supporting mat 120. For example, the hook fastener 126 is formed to vertically protrude upward from the second outer frame 123 of the bottom supporting mat 120. The hook fastener 126 may be hooked and fastened to the first outer frame 112 of the upper mat 110 by putting and pressing the upper mat 110 on the bottom supporting mat 120.

The foregoing exemplary embodiments may be implemented by combination between the upper mat 110 and the bottom supporting mat 120 having the grass passing spaces S1 and S2 of various shapes.

FIG. 7 is an exploded perspective view of the upper mat with a subsidence preventing groove according to the present disclosure, and FIG. 8 is a view of showing various shapes of the groove formed in the grass protection mat according to the present disclosure.

As shown in FIG. 7, with such shaped bottom supporting mat 120, all support pillars 115 provided in the upper mat 110 may be respectively supported on groove-shaped supporters 128 of the bottom supporting mat 120 in the state that the first body 111 of the grass protection mat 110 and the second body 121 of the bottom supporting mat 120 are arranged to overlap with each other in the same pattern.

Further, the support pillar 115 of the upper mat 110 is provided beneath the first body 111 and supports the first body 111 to be spaced apart at a predetermined distance from the bottom supporting mat 120 of the second body 121. According to one embodiment of the present disclosure, the support pillar is perpendicular to each vertex of polygonal shape of the first body 111 and extended toward the ground, and its bottom may be inserted and held in a groove-shaped supporter 128 of the bottom supporting mat 120.

Here, the support pillar 115 may be formed toward the ground at every vertex where a projection pillar 113 of the first body 111 is positioned. The projection pillar 113 and a buffering wing 114 are used in spreading a load applied to the upper mat, and extended upward from the first body 111, in which the buffering wing 114 may be placed between the projection pillars 113. Here, the buffering wing 114 may be taller than the projection pillar 113 so that the buffering wing 114 can efficiently distribute the load applied to the upper mat. In this case, an object such as people or vehicles, which applies the load to the grass protection mat, applies the load first to the buffering wing 114 and then the projection pillar. Thus, the load is first distributed by the buffering wing 114 and the remaining load is supported by the projection pillar 113, thereby more effectively protecting the grass. According to one exemplary embodiment, the lateral edge of the buffering wing 114, which is likely to touch the grass, is rounded to protect the grass from being damaged by the buffering wing 114, but is not limited thereto.

Meanwhile, the second body 121 and the first body 111 may have quadrangular, hexagonal, octagonal, diamond or the like polygonal or circular shape. However, as described above, the second body 121 and the first body 111 may have the same hexagonal shape, for better photosynthesis and the growth of grass.

According to the first embodiment of the present disclosure, among the structures for continuously connecting the grass passing spaces S1, the second body 121 is provided to have the shape and size to be hexagonally repetitively overlapped with the first body 11 having the hexagonal shape.

Further, as shown in FIG. 7, the second body 121 and the outer frame 123 of the bottom supporting mat 120, to be in contact with the ground, are formed with grooves 127 on bottoms thereof to increase friction with the ground, and the grooves 127 are recessed along the lengthwise direction.

As shown in (a) to (d) of FIG. 8, the groove 127 may be implemented in the form of an arc groove 127*a* or a triangular groove 127*b* recessed on the bottoms of the second body 121 and the outer frame 124. Further, the groove 127 becomes thinner as it is closer to the ground as shown in (a) of FIG. 8, and is thus flexibly spread when the load is applied, thereby increases the contact area and has an improved effect of distributing the load.

As described above, the second body 121 and the outer frame 124, which are formed with the grooves 127 on the bottoms thereof, increase the friction with the ground after the grass protection mat is installed, so that the grass protection mat can be effectively prevented from freely moving on the ground and the load can be more effectively distributed, thereby minimize subsidence on soft ground such as wetland and secure growth space for grass.

FIGS. 9 to 11 are views of showing various upper mats according to the present disclosure.

FIG. 9 illustrates that the grass passing spaces are continuously connected to form a predetermined pattern based on a diamond-shaped body of the upper mat 110 or the bottom supporting mat 120. FIG. 10 illustrates the grass passing spaces are continuously connected to form a predetermined pattern based on an octagonal body. FIG. 11 illustrates the grass passing spaces are continuously connected to form a predetermined pattern based on a quadrangular body. Further, as another-shaped upper mat although it is not illustrated, the grass passing spaces may be continuously connected to form a predetermined pattern based on a circular body.

Thus, according to the present disclosure, the first body 111 and the second body 121 may have not the hexagonal shape but a polygonal shape, and the first body 111 may also have a polygonal shape different from the second body 121.

Accordingly, the overlapped shape between the upper mat 110 and the bottom supporting mat 120 is varied depending on characteristics of soil to which they will be installed, so that the grass protection mat can provide a space adapted to soil and be effectively prevented from the subsidence.

According to the foregoing exemplary embodiments, the bottom supporting mat with the body having a predetermined size and shape is fastened to the ground, and a certain mat with a body having a space optimized for characteristics of soil is selected as the upper mat and detachably put on the bottom supporting mat, thereby easily constructing or replacing the grass protection mat. Therefore, the photosynthesis of the grass can go smoothly by expanding the space of the mat, and the upper mat having a space suitable for soil can be selectively applied according to characteristics of the soil, thereby not only securing the grass passing space S1 but also effectively preventing the grass protection mat from the subsidence.

Further, to more firmly support the bottom supporting mat, a plurality of ground pegs protruding downward is used for fastening the mat to the ground, thereby fastening the bottom supporting mat to the ground without sliding, and connecting and fastening the upper mat thereon.

According to the present disclosure, the hook fastener provided in the bottom supporting mat is used to enable attachment/detachment between the bottom supporting mat and the upper mat arranged thereon, thereby coupling or separating the mats without an additional coupling tool and promoting convenience in construction.

Further, the attachment/detachment between the bottom supporting mat and the upper mat becomes easier, thereby having advantages of selectively replacing and applying the mats having various shapes depending on the characteristics of the soil.

Further, a distance between a space formed between the bottom supporting mat and the upper mat, through which a grass runner propagates is kept constant, thereby preventing the grass runner from being damaged by load.

Further, the ground peg protruding downward is provided to more firmly support the bottom supporting mat, when the mat is fastened to the ground, thereby the bottom supporting mat being fastened to the ground without sliding, and firmly being connected and fastened the upper mat thereon.

Although a few exemplary embodiments of the present disclosure have been shown and described, these are for illustrative purpose only and it will be appreciated by those skilled in the art that changes may be made in these embodiments without departing from the principles and spirit of the invention, the scope of which is defined in the appended claims and their equivalents.

REFERENCE NUMERALS

110: upper mat
111: first body
112: first outer frame
120: bottom supporting mat
121: second body
122: rug
123: second outer frame
124: hook fastener
125: ground peg
126: hook fastener
127: groove
S1: first grass passing space
S2: second grass passing space

What is claimed is:

1. A grass protection mat for soft ground, comprising:
an upper mat comprising a first body in which first grass passing spaces are continuously arranged and a first outer frame formed to finish an outer edge of the first body; and
a bottom supporting mat which is arranged under the upper mat,
wherein the bottom supporting mat comprises a second body in which second grass passing spaces are continuously arranged, and one or more hook fasteners which protrudes from the second body at a predetermined position corresponding to the first outer frame of the upper mat so that it is hooked to and coupled with a portion of the first outer frame,
wherein the bottom supporting mat further comprises a second outer frame having a quadrangular shape for finishing an outer edge of the second body to maintain an overall mat shape, and the second outer frame is formed with a groove recessed on a bottom thereof along a lengthwise direction, and
wherein the second body is formed with a groove recessed on a bottom thereof along a lengthwise direction.

2. The grass protection mat according to claim 1, wherein the hook fastener protrudes vertically upward from the second body of the bottom supporting mat.

3. The grass protection mat according to claim 1, wherein the hook fastener has a predetermined height to be coupled with the first outer frame.

4. The grass protection mat according to claim 1, wherein the bottom supporting mat further comprises a ground peg protruding from a bottom thereof to fasten the bottom supporting mat to ground.

5. The grass protection mat according to claim 4, wherein the ground peg has a pillar or sharp shape to be smoothly driven into ground.

6. The grass protection mat according to claim 4, wherein the ground peg protrudes toward ground from a position corresponding to an edge of the first outer frame.

7. The grass protection mat according to claim 4, wherein the ground peg is formed to be longer than a rug protruding toward ground from a bottom of the second body.

8. The grass protection mat according to claim 1, wherein the first body of the upper mat and the second body of the bottom supporting mat are different in shape in accordance with kinds of soil where grass grows.

9. The grass protection mat according to claim 1, wherein the first body of the upper mat and the second body of the bottom supporting mat have the same size or shape.

* * * * *